(12) United States Patent
Hsieh

(10) Patent No.: US 7,040,832 B2
(45) Date of Patent: May 9, 2006

(54) LOCKING DEVICE TO SECURE A TELESCOPIC TUBE ASSEMBLY

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 35 days.

(21) Appl. No.: 10/761,393

(22) Filed: Jan. 20, 2004

(65) Prior Publication Data

US 2005/0158118 A1    Jul. 21, 2005

(51) Int. Cl.
F16B 7/14 (2006.01)

(52) U.S. Cl. ............... 403/109.3; 403/109.6; 403/377; 403/378; 403/379.1; 403/379.2; 248/125.8

(58) Field of Classification Search ............ 403/109.1, 403/109.2, 109.3, 109.4, 109.6, 109.7, 109.8, 403/377, 378, 379.2, 379.3, 325, 379.4, 324, 403/379.5, 322.1, 322.3; 16/433, 441, 442; 248/125.8

See application file for complete search history.

(56) References Cited

U.S. PATENT DOCUMENTS

| | | | | |
|---|---|---|---|---|
| 1,217,709 A | * | 2/1917 | Cobel | ................. 135/75 |
| 4,185,936 A | * | 1/1980 | Takahashi | ................. 403/104 |
| 4,362,415 A | * | 12/1982 | Metz et al. | ............ 403/109.3 |
| 5,039,043 A | * | 8/1991 | Hodge | ................. 248/125.8 |
| 5,385,323 A | * | 1/1995 | Garelick | ................. 248/161 |
| 5,433,552 A | * | 7/1995 | Thyu | ................. 403/378 |
| 6,082,680 A | * | 7/2000 | Woodward et al. | ......... 248/682 |
| 6,347,777 B1 | * | 2/2002 | Webber et al. | ........... 248/354.1 |
| 6,354,664 B1 | * | 3/2002 | Chen | ................. 297/353 |
| 6,551,226 B1 | * | 4/2003 | Webber et al. | ............. 482/148 |
| 6,698,962 B1 | * | 3/2004 | Wang | ................. 403/109.4 |

* cited by examiner

Primary Examiner—Daniel P. Stodola
Assistant Examiner—Daniel J. Mills
(74) Attorney, Agent, or Firm—Dellett & Walters

(57) ABSTRACT

A locking device has an enclosure partially securely mounted on a peripheral edge of the outer tube and having a lever pivotally connected to the enclosure; and a positioning rod securely connected to a side of the lever to be driven by the lever and having a head formed on a free end of the positioning rod to correspond to one of the adjusting recesses of the inner tube such that pivotal movement of the lever is able to drive the head of the positioning rod to selectively move away from the corresponding adjusting recess to allow the inner tube to move relative to the outer tube.

4 Claims, 6 Drawing Sheets

LOCKING DEVICE TO SECURE A TELESCOPIC TUBE ASSEMBLY

BACKGROUND OF THE INVENTION

1. Field of the Invention

The present invention relates to a locking device, and more particularly to locking device to secure an inner tube in an outer tube of a telescopic tube assembly.

2. Description of Related Art

With reference to FIG. 6, a conventional locking device (50) for a telescopic tube assembly having an outer tube (40) and an inner tube (41) slidably received in the outer tube (40) includes a knob (51) rotatably mounted on a side of the locking device (50).

When the relative position of the inner tube (41) is to be readjusted, the operator has to hold the inner tube (41) to prevent the inner tube (41) from slipping too far into the outer tube (40). Then the operator is able to unscrew the knob (51) and change the relative position of the inner tube (41) to the outer tube (40). However, when a distal end of the inner tube (41) is provided with a heavy load, i.e. an illuminating device, the operator has to struggle to hold the weight of the illuminating device. Therefore, assistance from the other operators is essential. That is, it is almost impossible for a lone operator to finish the adjustment of the telescopic tube assembly, especially when a weighty object is on top of the telescopic tube assembly.

To overcome the shortcomings, the present invention tends to provide an improved locking device to mitigate the aforementioned problems.

SUMMARY OF THE INVENTION

The primary objective of the present invention is to provide an improved locking device to enable a lone operator to safely finish the adjustment of the relative position of the inner tube relative to the outer tube.

Another objective of the present invention is to eliminate danger to the operator by providing a safety device to prevent excessive movement of the inner tube relative to the outer tube.

Other objects, advantages and novel features of the invention will become more apparent from the following detailed description when taken in conjunction with the accompanying drawings.

DETAILED DESCRIPTION OF THE PREFERRED EMBODIMENT

Figure 1:
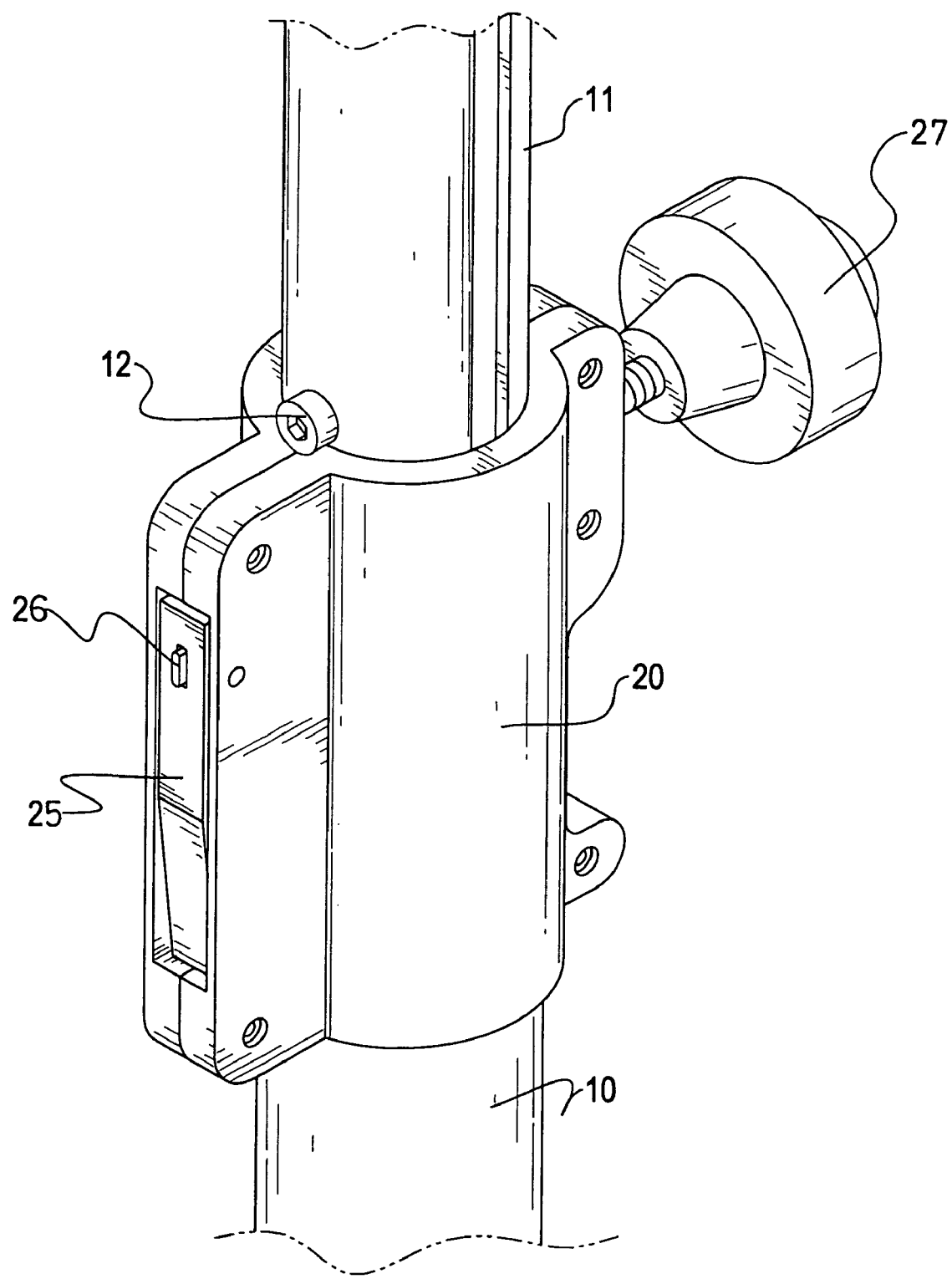
FIG. 1 is perspective view of the locking device applied on a telescopic tube assembly.
Figure 2:
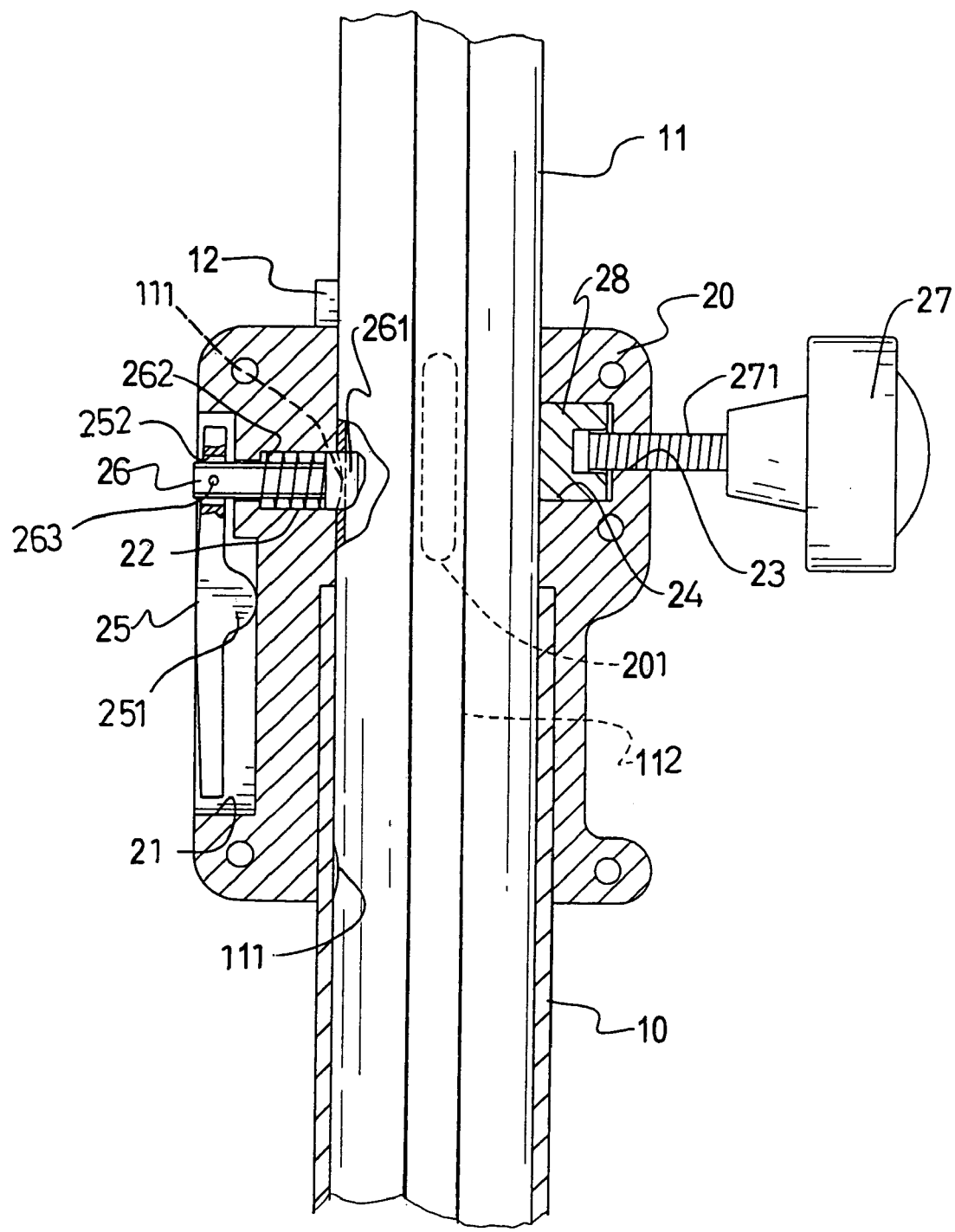
FIG. 2 is schematically cross sectional view of the locking device in FIG. 1.

With reference to FIGS. 1 and 2, a telescopic tube assembly includes an outer tube (10) and an inner tube (11) slidably received in the outer tube (10). The inner tube (11) has multiple adjusting recesses (111) defined in an outer periphery of the inner tube (11) and a guiding groove (112) defined on the outer periphery of the inner tube (11) along a longitudinal axis of the inner tube (11).

A locking device in accordance with the present invention includes an enclosure (20) partially securely mounted on a peripheral edge of the outer tube (40) and having a guide (201) formed on an inner face of the enclosure (20), a first space (21) defined in a side face of the enclosure (20), a first hole (22) defined through a bottom face defining the first space (21), a second hole (23) defined through the enclosure (20) to be opposite to the first hole (22) and a second space (24) defined to communicate with the second hole (23).

Furthermore, a lever (25) is received in the first space (21) and has a proximal end, a distal end, a pivot (251) and a through hole (252). The pivot (251) extends from the lever (25) and abuts the bottom surface of the first space (21) to allow the lever (25) to pivot in the first space (21). The through hole (252) is defined through the lever (25) close to the proximal end. A positioning rod (26) has a first distal end, a second distal end and a pivot pin (263). The first distal end is mounted pivotally in the through hole (252) in the lever (25). The second distal end of the positioning rod (26) has a head (261) corresponding to the adjusting recesses (111). The pivot pin (263) extends through the lever (25) and first distal end of the positioning rod (26) to allow the positioning rod (26) to pivot on the lever (25). A spring (262) is mounted on the positioning rod (26) and compressibly received in the first hole (22) such that when the positioning rod (26) is moved by the lever (25), the spring (262) is able to provide a recoil force to the positioning rod (26) to return the positioning rod (26). A knob (27) having a bolt (271) integrally formed with the knob (27) is screwingly extended into the second hole (23) to abut an abutting block (28) received in the second space (24) so that the outer periphery of the inner tube (11) is engaged by the abutting block (28). Especially, a safety device is mounted on the outer periphery of the inner tube (11) to prevent excessive movement of the inner tube (11) relative to the outer tube (10).

Figure 3:
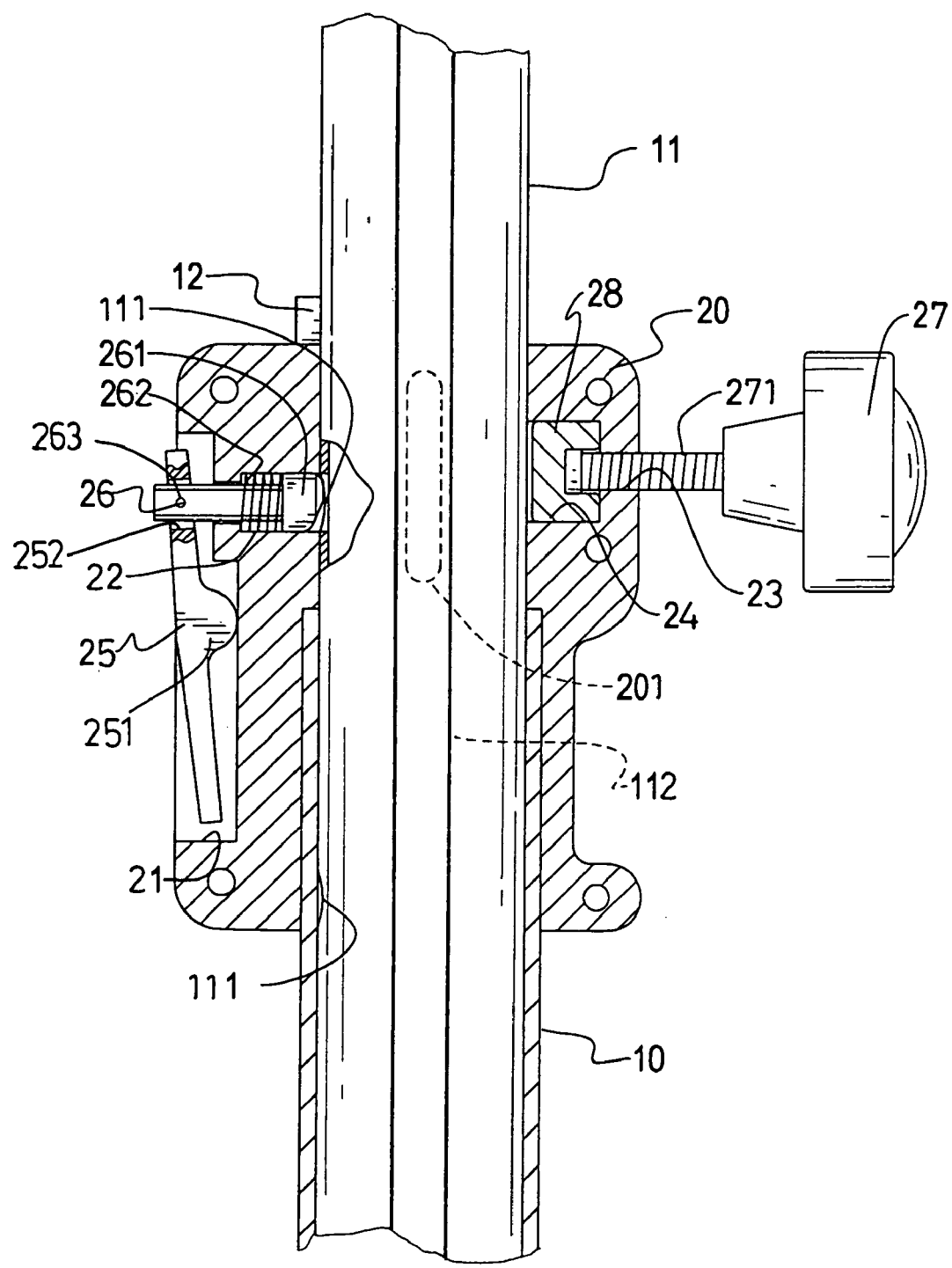
FIG. 3 is a schematic view showing the operation of the locking device of the present invention.

With reference to FIG. 3, it is noted that before the locking device of the present invention is in application, the head (261) of the positioning rod (26) is received in one of the adjusting holes (111) so as to secure the position of the inner tube (11) relative to the outer tube (10). When the lever (25) is depressed, the positioning rod (26) leaves the corresponding adjusting recess (111) to allow the operator to adjust the relative position of the inner tube (11) to the outer tube (10). After adjustment of the relative position of the inner tube (11) to the outer tube (10), the spring (262) provides a recoil force to the positioning rod (26) to force the positioning rod (26) to return to its original position such that the head (261) of the positioning rod (26) is received in a corresponding one of the adjusting recesses (111) of the inner tube (11) and the adjustment of the telescopic tube assembly is accomplished.

However, during the adjustment of the telescopic tube assembly, the operator is able to use the abutting block (28) to secure the position of the inner tube (11) in the outer tube (10). That is, the operator is able to use the abutting block (28) to increase the friction between the abutting block (28) and the outer periphery of the inner tube (11) by rotating the knob (27) such that the position of the inner tube (11) in the outer tube (10) is temporarily secured. Alternatively, the operator is able to use the abutting block (28) as an auxiliary securing device to secure the position of the inner tube (11) relative to the outer tube (10).

Further, the guide (201) slidable in the guiding groove (112) is able to smoothen the sliding movement of the inner tube (11) to the outer tube (10).

Preferably, the safety device (12) which is mounted on the outer periphery of the inner tube (11) is a boss. The boss (12) is integrally formed on the outer periphery of the inner tube (11) such that excessive sliding movement of the inner tube (11) relative to the outer tube (10) is prevented.

Figure 4:
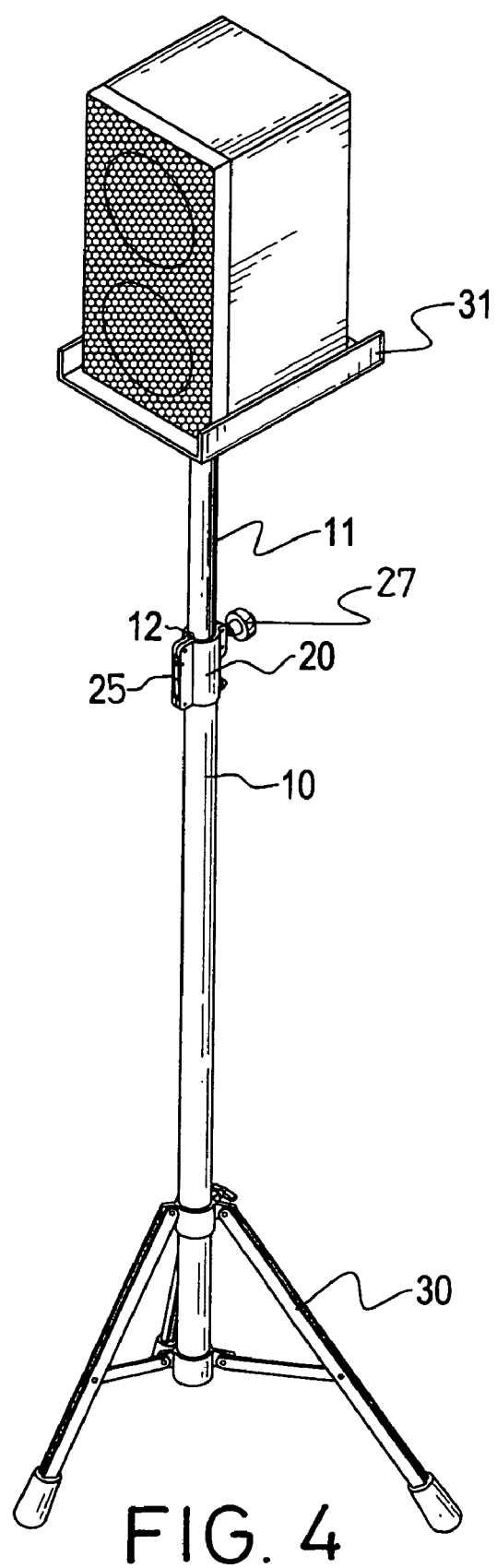
FIG. 4 is a schematic view showing the application of the locking device.
Figure 5:
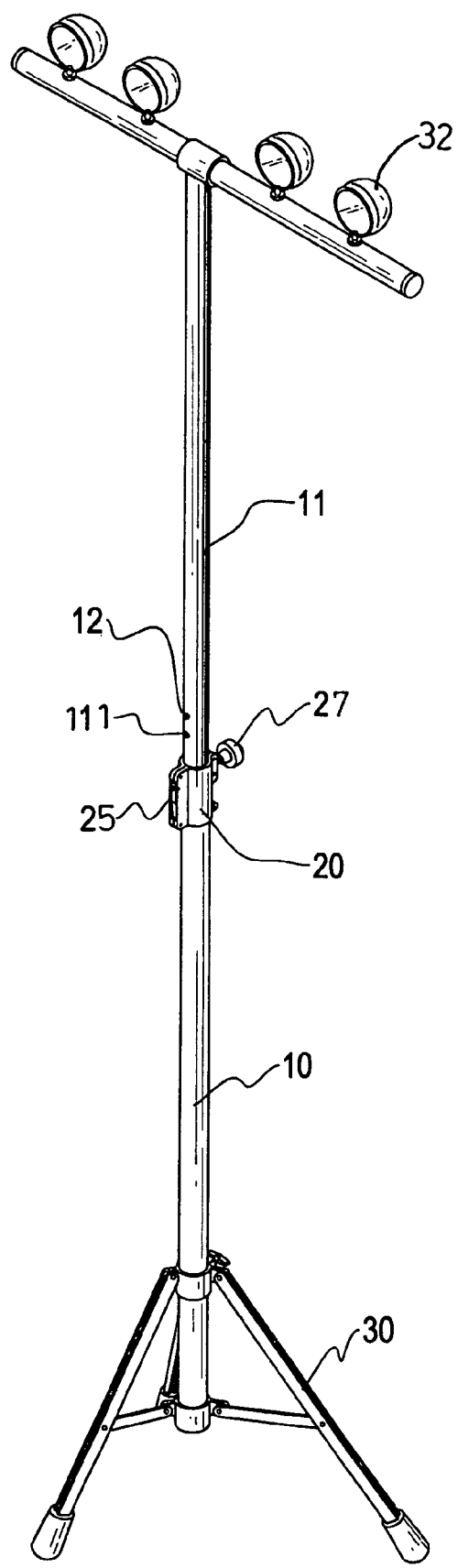
FIG. 5 is a schematic view showing an illuminating device is mounted on the telescopic assembly with the locking device of the present invention applied thereto.
Figure 6:
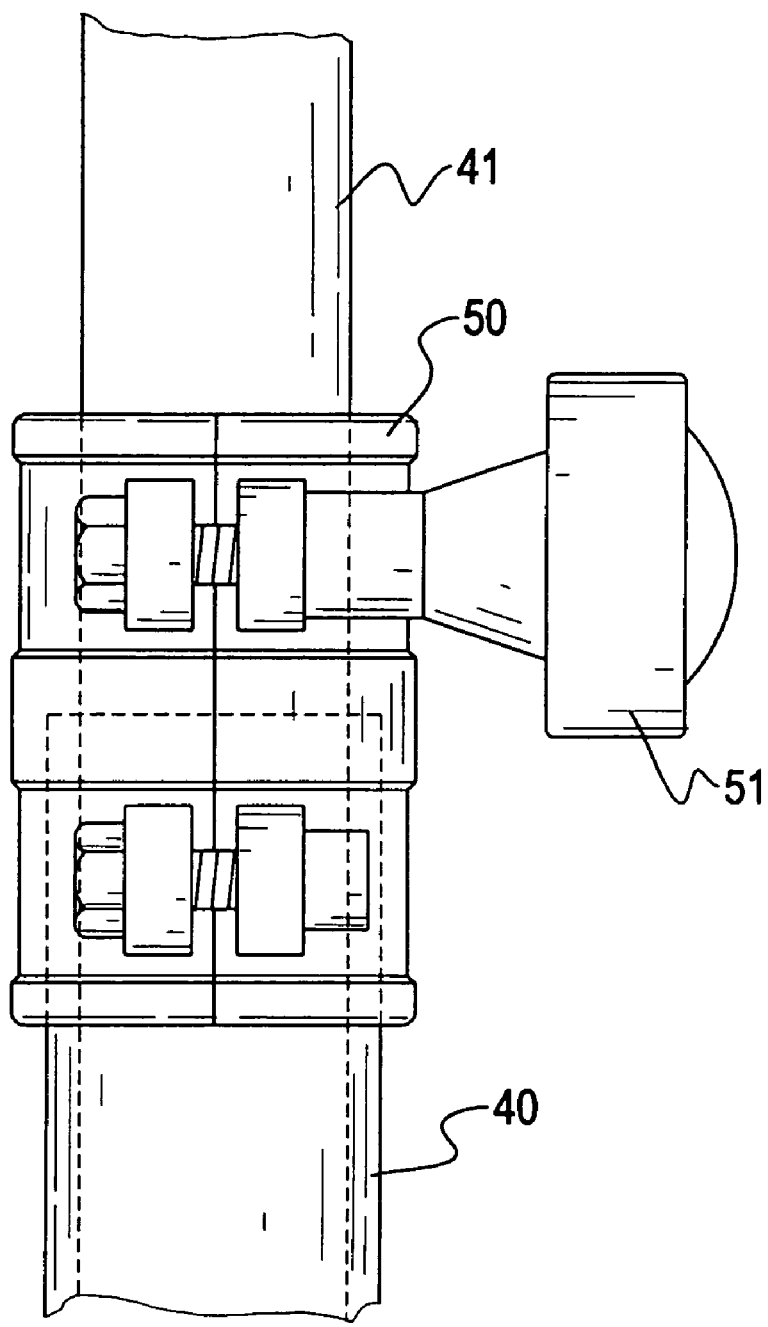
FIG. 6 is side view showing a conventional locking device applied to a telescopic tube assembly.

With reference to FIGS. 4 and 5, it is noted that when a loudspeaker (31) or an illuminating device (32) is mounted on top of the free end of the inner tube (11), the locking device of the present invention is able to safeguard the operator from possible injury by the sudden falling of the inner tube (11) due to the weight on top of the telescopic tube assembly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking device in combination with a telescopic tube assembly, wherein
    the telescopic tube assembly comprises:
        an outer tube; and
        an inner tube slidably received in the outer tube and having multiple adjusting recesses defined in an outer periphery of the inner tube; the locking device comprises:
    an enclosure partially securely mounted on a peripheral edge of the outer tube and having
        a lever pivotally connected to the enclosure and having a distal end, a proximal end, a pivot extending from the lever and a through hole defined through the lever close to the distal end;
        a first space defined in a side face of the enclosure to receive the lever and having a bottom surface abutting the pivot of the lever to allow the lever to pivot in the first space; and
        a second space defined in the enclosure to be opposite to the first space to receive therein an abutting block to engage with the outer periphery of the inner tube;
        a first hole in communication with the first space;
        a second hole in communication with the second space;
        a bolt screwed through the second hole in the enclosure to abut an outer periphery of the abutting block to force the abutting block to engage the outer periphery of the inner tube so as to secure position of the inner tube relative to the outer tube; and
    a positioning rod mounted pivotally in the through hole in the lever to be driven by the lever and having
        a first distal end mounted pivotally in the through hole in the lever;
        a second distal end;
        a pivot pin extending through the lever (25) and first distal end of the positioning rod to allow the positioning rod (26) to pivot on the lever;
        a head formed on the second distal end of the positioning rod to correspond to one of the adjusting recesses of the inner tube such that pivotal movement of the lever is able to drive the head of the positioning rod to selectively move away from the corresponding adjusting recess to allow the inner tube to move relative to the outer tube; and
        a spring mounted around the positioning rod to provide a recoil force to the positioning rod to return the positioning rod to its original position after being driven by the lever to leave the corresponding adjusting recess.

2. The locking device in combination with a telescopic tube assembly as claimed in claim 1, wherein the inner tube has a guiding groove defined in the outer periphery of the inner tube along a longitudinal axis and the enclosure has a guide formed on an inner face of the enclosure to be received in the guiding groove such that movement of the inner tube relative to the outer tube is smooth.

3. The locking device in combination with a telescopic tube assembly as claimed in claim 1, wherein a boss is integrally formed on the outer periphery of the inner tube to be engage with a peripheral side of the outer tube to prevent excessive movement of the inner tube relative to the outer tube.

4. The locking device in combination with a telescopic tube assembly as claimed in claim 2, wherein a boss is integrally formed on the outer periphery of the inner tube to be engage with a peripheral side of the outer tube to prevent excessive movement of the inner tube relative to the outer tube.

* * * * *